US009802635B1

(12) United States Patent
White

(10) Patent No.: US 9,802,635 B1
(45) Date of Patent: Oct. 31, 2017

(54) AUXILIARY SHELF FOR SHOPPING CARTS

(71) Applicant: Paul M. White, Highlands Ranch, CO (US)

(72) Inventor: Paul M. White, Highlands Ranch, CO (US)

(*) Notice: Subject to any disclaimer, the term of this patent is extended or adjusted under 35 U.S.C. 154(b) by 0 days.

(21) Appl. No.: 15/261,656

(22) Filed: Sep. 9, 2016

(51) Int. Cl.
*B62B 3/14* (2006.01)

(52) U.S. Cl.
CPC .......... *B62B 3/1468* (2013.01); *B62B 3/1472* (2013.01)

(58) Field of Classification Search
CPC ........ B62B 3/02; B62B 3/1472; B62B 3/1468
See application file for complete search history.

(56) References Cited

U.S. PATENT DOCUMENTS

| | | |
|---|---|---|
| 3,265,297 A | 8/1966 | Behrens |
| 3,381,849 A | 5/1968 | Karlsson |
| 3,534,973 A | 10/1970 | Elliott |
| 3,912,291 A | 10/1975 | Frisch |
| 3,993,319 A | 11/1976 | Day |
| 4,376,502 A | 3/1983 | Cohen |
| 4,487,134 A | 12/1984 | Foote |
| 4,583,753 A | 4/1986 | Economy |
| 4,679,818 A | 7/1987 | Kakavas |
| 4,721,317 A | 1/1988 | Avot |
| 4,848,620 A | 7/1989 | Chap |
| 5,265,893 A | 11/1993 | Ettlin |
| 5,366,123 A | 11/1994 | Range |
| 6,354,612 B1* | 3/2002 | Adamson .............. B62B 3/1468 211/126.6 |
| 6,708,627 B1 | 3/2004 | Wood |
| 6,749,204 B2 | 6/2004 | Werner |
| 8,052,158 B2 | 11/2011 | Tyrrell |
| 8,360,441 B2* | 1/2013 | Caruso .................. B62B 3/1472 108/26 |
| 2005/0275177 A1 | 12/2005 | Buckley, III |
| 2008/0072484 A1 | 3/2008 | Giampavolo et al. |
| 2014/0084036 A1 | 3/2014 | Hemann |

FOREIGN PATENT DOCUMENTS

| | | |
|---|---|---|
| CA | 458148D | 7/1949 |
| FR | 4656020 | 4/1929 |

* cited by examiner

*Primary Examiner* — John Walters
*Assistant Examiner* — James Triggs

(57) ABSTRACT

A shelf that is adapted for engaging the cargo basket of a shopping cart, the cargo basket having a frame made of metal wire. The shelf providing a platform having a leading edge of a leading edge length and an aft edge of an aft edge length, the platform having spaced apart sides that extend from the aft edge to the leading edge. Each of the sides of the platform having opposing side hooks, each side hook extending away from a respective side and further extending down and terminating in a side hook tip that lies below aft edge of the platform, so that the shelf is adapted for attaching to the frame of the cargo basket by engaging the forward edge of cargo basket with the end hooks, and engaging the sides of the cargo basket.

5 Claims, 1 Drawing Sheet

AUXILIARY SHELF FOR SHOPPING CARTS

BACKGROUND OF THE INVENTION

(a) Field of the Invention

This application relates to a device and system for increasing the capacity of a shopping cart, and for providing advertising space at a location that is easily visible to the shopper while using the cart. More particularly, but not by way of limitation, to a removable tray that cooperates with a shopping cart to provide shelf space that provides segregated support for heavy or easily damaged products, such as milk, bread, eggs, or flowers.

(b) Discussion of Known Art

Shopping carts provide valuable utility to stores in that they not only enhance the customer's shopping experience by holding and carrying the merchandise to be purchased, but also provide opportunities for placing advertising. The placement of advertisement on shopping carts provides an important source of revenue to the merchant, and helps offset, if not pay-off completely, the cost of this important merchandising tool. In fact, the provision of advertising space is so important that manufacturers of shopping carts integrate advertising support sections into shopping carts. An example of such a shopping cart is found in U.S. Pat. No. 5,235,767 to Waterman, et al., assigned to United Steel & Wire Co. of Battle Creek Mich.

Accordingly, providing a customer with shopping carts that are capable of holding large amounts of merchandise, while maintaining the ability to fit through high-traffic store isles is an important objective for retailers. Thus, improving a shopping cart's carrying capacity, while retaining standardized dimensions is an important benefit to retailers.

Still further, while shopping carts seem to be ubiquitous, they are expensive assets for retailers. Accordingly, there remains a need for a device that can increase the carrying capacity of a shopping cart, and which does not require that merchants purchase new shopping carts to take advantage of these benefits.

Additionally, there remains a need for an accessory for shopping carts that can promote or facilitate the purchase of items that can be easily damaged when placed in a shopping cart. Examples of such items include bread, eggs, and flowers. Unfortunately, shoppers often damage these types of products while shopping, and then merely place them back on the shelves instead of purchasing them once damaged.

Still further, there remains a need for a shopping cart accessory that improves the carrying capabilities of an existing shopping cart, while preserving the ability of the shopping cart to nest with other shopping carts, and thus allow efficient collection and storage of the shopping carts.

Therefore, a review of known art reveals that there remains a need for a device that allows retailers to improve the productivity and usefulness of their shopping carts, while at the same time enhancing the shopping experience for the customer.

SUMMARY

Providing an accessory for shopping carts that includes a shelf section that has a forward edge and an aft edge can solve problems left unanswered by known art. The forward edged of the accessory is adapted for engaging the forward wall of a shopping cart, while the aft edge is adapted for engaging and being supported from the sidewalls of the shopping cart.

More particularly, but not by way of limitation, it is contemplated that a shelf that cooperates with a wire shopping cart, of the type disclosed in U.S. Pat. No. 2,890,057 to Davis, which is incorporated herein by reference, or U.S. Pat. No. 3,353,836 to Davis, also incorporated herein by reference. It is contemplated that the disclosed invention will include a set of hooks that cooperate with the mesh of the basket front end of the basket of the cart.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
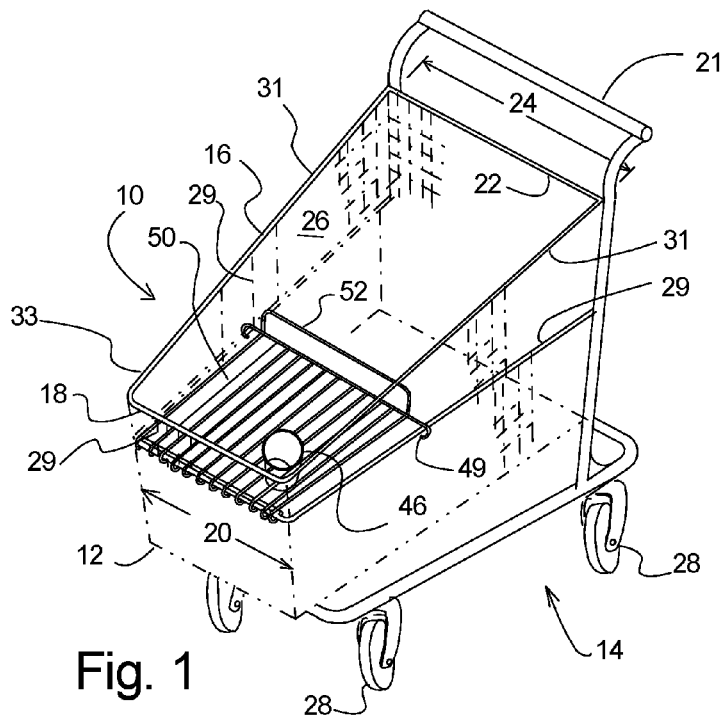
FIG. 1 is a perspective view of an embodiment of the invention in use.
Figure 2:
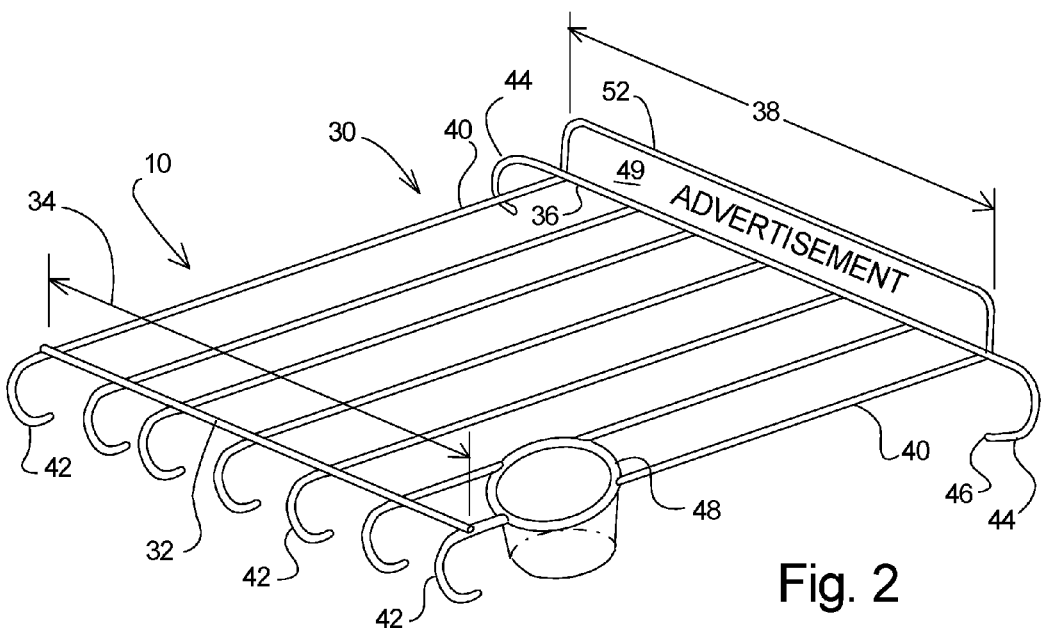
FIG. 2 is a perspective view of the embodiment illustrated in FIG. 1.

Turning now to FIGS. 1 and 2 where an auxiliary shelf 10 that is adapted for engaging the cargo basket 12 of a shopping cart 14 through the use of features disclosed here. As discussed above, it is contemplated that the shopping cart 14 is of the type disclosed in U.S. Pat. No. 2,890,057 to Davis. These types of shopping carts are characterized by their use of a cargo basket that is supported from a frame with casters and wheels. Typically, the frame will include a handle that allows the cart to be pushed by the user, and the cargo basket will typically include features that will allow several of the shopping carts to nest together. Typically, this will require that the cargo basket be generally wedge-shaped, converging from the aft end towards the forward end of the cargo basket, which is from where the handle is situated, towards the front wheels of the frame.

As shown in the example of FIG. 1, the frame 16 of the cargo basket 12 will is likely to be made of metal wire. Some manufacturers use cargo baskets that are primarily made of molded plastic, but these will typically also include a frame that is made of a generally rigid material such as metal. As shown in FIG. 1, the frame 16 will include a forward edge 18 that is of a length 20, and is generally parallel to the handle 21 that is used to push the shopping cart 14. Additionally, the frame 16 will include a rear edge 22 of a rear edge length 24. As can be understood from FIG. 1, the rear edge length 24 will be longer than the forward edge length 20, so as to allow nesting of the shopping carts. FIG. 1 also shows that the cargo basket 12 will also include sides 26 that extend from the rear edge 22 to the forward edge 18, and is supported from the cart frame 16, which will include at least four casters 28.

Turning now to FIGS. 1 and 2, it will be understood that it is contemplated that the disclosed auxiliary shelf 10 will include a platform 30. The platform 30 will include a leading edge 32 of a leading edge length 34, and an aft edge 36 of an aft edge length 38. Additionally, the platform 30 will include spaced apart sides 40 that extend from the aft edge 36 to the leading edge 32. The frame 16 will also include several topmost frame rods 29 that extend below the top surface 31 of the cargo basket 12. FIG. 1 also illustrates that the topmost front 33 of the cart basket 14 provides an additional constraint for the products placed on top of the disclosed auxiliary shelf 10. This provides a secure support surface, which helps shoppers avoid damaging items as may occur when items are placed directly on top of one another. Additionally, since the disclosed auxiliary shelf 10 is positioned at a relatively high and forward location on the cargo basket 12, the auxiliary shelf can move along the frame rods 29, and is positioned away from the area occupied by a mating stacked cart, which means that use of the disclosed auxiliary shelf auxiliary does not impede or prevent cart stacking.

FIG. 2 illustrates that the platform 30 will also include at least two spaced apart end hooks 42 that extend down from the leading edge 32 of the platform 30. Each end hook 42 will terminate in an end hook tip 46, located below the platform 30. The end hooks 42 will allow the auxiliary shelf 10 to engage the frame 16 of the cargo basket 12. Additionally, since the cargo basket itself is typically made of metal wire or of molded plastic with apertures, as is the shopping cart disclosed in U.S. Pat. No. 7,959,166 to Splain et al., incorporated herein by reference, the end hooks 42 will engage the apertures or frame of the cargo basket. It will be understood that two end hooks 42 will provide stability to the support of the platform 30.

Additionally, FIG. 2 also illustrates that each of the sides 40 of the platform 30 will include opposing side hooks 44. As shown in FIG. 2, each of the side hooks 44 will extend away from its respective side 40 and then extending down and terminate in a side hook tip 46. As illustrated, the hook tip 46 will preferably be positioned at a location below aft edge 36 of the platform 30. This arrangement will allow the shelf to attaching to the frame 16 of the cargo basket 12 by engaging the forward edge of cargo basket through the use of the end hooks 42, and also engage the sides 26 of the cargo basket.

While a preferred example of the disclosed invention uses at least four hooks (end hooks 42 and side hooks 44) to engage the frame of the cargo basket, it is contemplated that a three-point support arrangement could also be used. For example, it is contemplated that a single, centralized hook may be provided along the leading edge 32, and the pair of opposing side hooks 44, used to as described above.

FIGS. 1 and 2 also show that a generally, frusto-conical, or similarly shaped, sleeve 48 will be provided through the platform 30. The sleeve 48 is provided for allowing shoppers to place a flower bouquet in the sleeve 48, and thus remind the shopper of the availability of flowers at the particular store. Additionally, the sleeve 48 will hold the flowers at a safe location, such that the flowers are not crushed or the bouquet disassembled by placement of the bouquet amongst other items being purchased. Still further, it is contemplated that the sleeve 48 will be generally flush with the top 50 of the platform 30, so that items may be placed on the on the entire platform 30 without encountering protrusions from the sleeve 48.

It will be understood that the disclosed invention will also create more carrying space and thus allow shoppers to arrange items being purchased in a safer, more efficient, manner. For example, heavy items such as milk containers or canned items may be placed in the cargo basket, while more delicate items, such as bread and flowers, may be placed on the platform 0. Accordingly, the user will still have the children's seat available for use, and still be able to segregate items so as to prevent damage and create greater cargo area.

Still further, it will be understood that the disclosed system will not impede the shopping carts from being stacked as they typically are (as discussed in U.S. Pat. No. 8,544,858 to Eberlein, incorporated herein by reference). Additionally, the use of hooked attachments, such as end hooks 42 and side hooks 44, will allow easy removal of the platform 30, or the pivoting of the platform 30 to a position that allows placement of large items into the cargo basket 16, and then the platform 30 repositioned over the large item, or simply left hanging from the shopping cart.

Another advantage of the disclosed invention is that the platform 30, and the associated support structure, allows the use of a rear retainer 52, which acts as a retaining barrier to prevent items on the platform 30 from rolling into the cargo basket. In addition to providing this retention function, this rear retainer 52 also provides support for advertising materials, and thus acts as an advertising support panel 49, or simply as an advertising panel. The position of the rear retainer 52 can provide particularly effective location for advertising materials, as it is directly in front of the handle at a location that is clearly and prominently visible to the shopper.

Thus, it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A shelf that is adapted for engaging the cargo basket of a shopping cart, the cargo basket having a frame made of metal wire, the frame having a forward edge of a length and a rear edge of a rear edge length, the rear edge length being longer than the length or the forward edge, the cargo basket further having sides that extend from the rear edge to the forward edge, the cargo basket the being supported from a cart frame that includes casters, the cart frame further having a push handle that is attached to the cart frame at a location near the rear edge, so that a user may push the shopping cart using the push handle, the shelf comprising:

a platform having a leading edge of a leading edge length and an aft edge of an aft edge length, the platform having spaced apart sides that extend from the aft edge to the leading edge;

the platform further comprising a pair of spaced apart end hooks that extend away from the aft edge and down from the leading edge of the platform, each end hook terminating in an end hook tip;

each of the sides of the platform having opposing side hooks, each side hook extending away from a respective side and further extending down and terminating in a side hook tip that lies below aft edge of the platform, so that the shelf attaches to the frame of the cargo basket by engaging the forward edge of cargo basket with the end hooks, and engaging the sides of the cargo basket with the sidehooks.

2. A shelf according to claim 1 wherein said platform has a generally frusto-conical passage extending through the platform, the generally frusto-conical passage being adapted for accepting goods, including a bundle of stems of a bouquet of flowers.

3. A shelf according to claim 2 and further comprising an advertising support panel, the advertising support panel being positioned along the aft edge of the platform.

4. A shelf according to claim 3, wherein said generally conical passage is positioned next to the leading edge of the platform.

5. A shelf that is adapted for engaging the cargo basket of a shopping cart, the cargo basket having a frame made of metal wire, the frame having a forward edge of a length and a rear edge of a rear edge length, the rear edge length being longer than the length or the forward edge, the cargo basket further having sides that extend from the rear edge to the forward edge, the cargo basket the being supported from a cart frame that includes casters, the cart frame further having a push handle that is attached to the cart frame at a location near the rear edge, so that a user may push the shopping cart using the push handle, the shelf comprising:

a single, generally rigid planar platform having a leading edge of a leading edge length and an aft edge of an aft edge length, the platform having spaced apart sides that extend from the aft edge to the leading edge;

the platform further comprising a pair of spaced apart end hooks that extend away from the aft edge and down from the leading edge of the platform, each end hook terminating in an end hook tip;

each of the sides of the platform having opposing side hooks, each side hook extending away from a respective side and further extending down and terminating in a side hook tip that lies below aft edge of the platform, so that the shelf attaches to the frame of the cargo basket by engaging the forward edge of cargo basket with the end hooks, and engaging the sides of the cargo basket with the sidehooks.

* * * * *